United States Patent
Luna et al.

(10) Patent No.: US 7,049,946 B2
(45) Date of Patent: May 23, 2006

(54) DEVICE FOR DETECTING THE PRESENCE OF OBJECTS IN A BLIND ANGLE OF A MOTOR VEHICLE

(75) Inventors: Francesc Daura Luna, Sant Quirze del Vallés (ES); Lluís Martinez Garcia, Mollet del Vallés (ES)

(73) Assignee: Fico Mirrors, S.A. (ES)

( * ) Notice: Subject to any disclaimer, the term of this patent is extended or adjusted under 35 U.S.C. 154(b) by 0 days.

(21) Appl. No.: 10/478,042

(22) PCT Filed: Mar. 15, 2002

(86) PCT No.: PCT/ES02/00128

§ 371 (c)(1),
(2), (4) Date: Jun. 14, 2004

(87) PCT Pub. No.: WO02/093529

PCT Pub. Date: Nov. 21, 2002

(65) Prior Publication Data

US 2004/0233048 A1    Nov. 25, 2004

(51) Int. Cl.
*B60Q 1/00* (2006.01)

(52) U.S. Cl. .................. 340/435; 340/436; 340/551
(58) Field of Classification Search .............. 340/903, 340/426, 436, 547, 435, 551; 280/735
See application file for complete search history.

(56) References Cited

U.S. PATENT DOCUMENTS

| 4,232,286 A | 11/1980 | Voll ........................... 340/51 |
| 5,793,308 A * | 8/1998 | Rosinski et al. ............ 340/903 |
| 6,072,391 A * | 6/2000 | Suzuki et al. ............... 340/468 |
| 6,140,933 A | 10/2000 | Bugno et al. ............ 340/693.5 |
| 6,370,475 B1 * | 4/2002 | Breed et al. ................ 701/301 |
| 6,424,273 B1 * | 7/2002 | Gutta et al. ................. 340/937 |
| 6,586,926 B1 * | 7/2003 | Bomya .................. 324/207.17 |

FOREIGN PATENT DOCUMENTS

| DE | 195 34 942 C1 | 5/1998 |
| EP | 0 591 743 A1 | 4/1994 |
| ES | 2 164 568 | 2/2002 |
| GB | 2 130 729 A | 6/1984 |
| GB | 2 248 692 A | 4/1992 |
| WO | WO 01/15110 A1 | 3/2001 |

* cited by examiner

*Primary Examiner*—Anh V. La
(74) *Attorney, Agent, or Firm*—Black Lowe & Graham PLLC

(57) ABSTRACT

A device for detecting the presence of objects in a vehicle's blind spot. The invention relates to a device for detecting the presence of objects in a vehicle's blind spot, where the objects contain at least one ferromagnetic material whereby they distort the earth's magnetic field. The device is mounted on a vehicle that has at least one blind spot. The detection device can detect the object located in the blind spot because it is provided with a unit for detecting the distortion of the earth's magnetic field caused by the object. Preferably it includes a logical circuit with neural nets for processing the signals received from the sensors.

22 Claims, 3 Drawing Sheets

DEVICE FOR DETECTING THE PRESENCE OF OBJECTS IN A BLIND ANGLE OF A MOTOR VEHICLE

AIM OF THE INVENTION

The invention relates to a device for detecting the presence of objects in a vehicle's blind spot, where the objects contain or are manufactured from a ferromagnetic material whereby they distort the earth's magnetic field. The device is mounted on a vehicle, that has at least one blind spot, in such a way that the detection device can detect the object located in the blind spot.

STATE OF THE ART

Conventional vehicles are usually provided with rear view mirrors, consisting generally of one internal mirror and two external ones, which enable the user or driver to look behind without having to turn himself around. However, in spite of being provided with a series of mirrors, there are usually some areas, called blind spots, that are not covered by said mirrors.

Various alternatives exist, such as the use of radar devices, the use of pivoting rear view mirrors, etc., which are intended to cover these blind spots and the danger they present. However, they have not solved the problem completely and/or they are expensive devices and, therefore, their market introduction is limited.

It is also known to use systems that capture an image directed towards a blind spot using a CCD camera and show said image to the user by means of a screen placed inside the vehicle. These systems enable the user to see the blind spots without having to sit up, however, they have a series of disadvantages: they require image transmission systems of a sufficient standard so that the user can perceive a clear image, which means working with a large number of pixels, there must be space available inside the vehicle to position the corresponding screen, the system does not process the image, it only transmits it, etc. Therefore, these systems are expensive and do not actively contribute to detecting risk situations.

Also there are some devices for detecting the presence of objects, of the type that are mounted on a vehicle, that has at least one blind spot, with the detection device being able to detect an object located in the blind spot and comprising: a receiver capable of detecting electromagnetic waves, with a focusing device, and a photosensor that converts said received electromagnetic waves into electric signals, an electronic circuit that converts the electrical signals into digitalised signals, a logical circuit that analyses the digitalised signals in order to analyse the presence of objects in the blind spot that move relative to said vehicle, and which emits output signals that vary according to the analysis result, and indicator elements, activated by the output signals that can be perceived by the driver. These devices have been described in document ES P200000378, which is hereby incorporated herein by reference, and they represent a series of improvements made to the devices existing previously on the market.

However, optical type systems are not problem free in certain low visibility situations (glaring sunlight, fog, etc).

SUMMARY OF THE INVENTION

The aim of the invention is to overcome these drawbacks. This aim is achieved by means of a device for detecting the presence of objects of the type indicated at the beginning, characterised in that it is provided with means for detecting said distortion of the earth's magnetic field caused by said object.

In fact, detection of the earth's magnetic field as well as the possible distortion thereof is not influenced by environment conditions (sunlight glare, fog, etc.) which cause problems in the optical type detection devices. In addition, the invention enables competitively priced detection devices to be developed.

Preferably, the detection device comprises: [a] at least one magnetic field sensor, suitable for producing electrical signals according to the magnetic field detected, [b] an electronic circuit that converts the electrical signals into digitalised signals, [c] a logical circuit that analyses the digitalised signals in order to analyse the presence of the object in the blind spot, and which produces output signals that vary according to the analysis result, and [d] indicator elements, activated by the output signals.

The earth's magnetic field is distorted by the presence of a ferromagnetic material. In this way, a conventional vehicle comprising a large number of components made from ferromagnetic materials, distorts the earth's magnetic field surrounding it. The presence of an object, also made at least partially from ferromagnetic materials, causes the magnetic field to be distorted a second time. This distorted magnetic field, once captured by the sensor and processed by an electronic circuit, is analysed by a logical circuit which determines whether the detected values correspond to the presence of an object in the blind spot.

The sensors can be of any kind providing that they fulfil the requirements of the invention. In this sense, they can be, for example, flux gate magnetometers (flux-gate sensors), Hall type sensors, magnetoinductive sensors or mangnetoresistive sensors. The resolution level which they must preferably be able to detect must be less than or equivalent to 0.01 Gauss.

The detector must be able to locate the object in the space around the vehicle, and in particular, it must be able to know whether it is in the blind spot. In this sense, it is advantageous that the sensors are able to detect at least two of the three spatial components in a magnetic field.

The detected magnetic field signals can be influenced by the inclination angle of the vehicle with respect to the horizontal. Therefore, it is advantageous that the detection device according to the invention comprises, in addition, a device for measuring the inclination angle of said vehicle with respect to a horizontal plane. In this way, said inclination angle can be taken into consideration when assessing the detected values. This inclination angle measuring device can be, for example, a device that detects the third spatial component in the magnetic field, an inclinometer, etc.

The sensors, in particular the flux-gate sensors, can be current or voltage fed. However, since the sensitivity of the sensor depends on the current amplitude circulating through the primary circuit, it is advantageous that the sensors are of the current fed type.

Preferably, the detection device reads said magnetic field at least once every 100 ms.

Advantageously, the detection device can distinguish whether the object is another approaching vehicle or whether it is another object. In this way, the detection device can eliminate possible false alarm situations when it detects the presence of objects that do not represent any danger for the vehicle, such as vehicles travelling in the opposite direction, static objects on the roadside, parked vehicles, etc. The logical circuit preferably comprises neural nets. The detection device can therefore undergo a training process which enables it to ascertain the potential risk conditions for the vehicle from the other conditions which, although they distort the earth's magnetic field, do not pose any potential danger as far as the vehicle is concerned.

The detection device has preferably an action radius of at least 4 meters, measured from each of said sensors. This action radius can therefore cover substantially the blind spot in most conventional vehicles.

It is advisable that the sensor is as far away as possible from the ferromagnetic materials in the vehicle, since these also distort the earth's magnetic field. In this sense, it is convenient that the sensor is placed within an outside rear view mirror assembly on said vehicle.

On the other hand, the distortion of the earth's magnetic field that is caused by a vehicle is relatively small. In this sense, it can be advantageous to position the sensor in the rear of the vehicle. In this way, the action radius can be extended towards the rear of the vehicle.

As already indicated, the vehicle itself distorts the earth's magnetic field. In order to remove this distortion from the signal detected by the sensors, it is advantageous to have two sensors placed in symmetrical arrangement with respect to the vehicle's longitudinal axis, and to calculate the difference between the signals produced by each of said sensors. In addition, with calibration data (which are provided by the sensor values when the vehicle is in motion, when no objects are present), it is possible to subtract from the signal produced by each of said sensors, the part corresponding to the distortion of the earth's magnetic field caused by the vehicle itself. Preferably, the detection device has a sensor in each of the outside rear view mirrors on said vehicle.

Optionally, it is possible to improve the detection device's ability to analyse risk situations, by adding to the detected characteristics of an approaching object, the ability to detect whether the vehicle carrying the detection device has begun to indicate that an object is approaching. In particular, it is advantageous that the detection device is able to detect when the indicator light is illuminated and/or can detect when the vehicle steering wheel is turned.

It is also recommendable that the detection device is able to communicate various signals to the vehicle user or driver, which enable the warning signal to be adjusted according to the risk of collision. Therefore, it is preferable that the indicator elements include light signals with at least two colours, each colour indicating a different level of warning. It is also advantageous to include an output element which provides a pictogram representation, said output element being a LED matrix or a graphics screen.

Moreover, a risk situation may arise if a passenger in the vehicle carrying the detection device opens a door without looking if another vehicle is approaching from behind. It is, therefore, advantageous that the detection device also indicates said risk situations to the vehicle passengers.

Finally, it is advantageous that the detection device can act upon the door closing action. Therefore, for example, it can lock a door if a risk situation is detected As indicated above, the distortion of the earth's magnetic field is on a small scale. In this sense, it is useful for detecting objects in the blind spot. However, other object detection devices exist, such as for example that described in the afore-mentioned document ES P200000378, which detect objects at greater distances, including outside the vehicle's blind spot. It can be advisable that the detection device comprises, therefore, other means for detecting the presence of objects, as well as the means for detecting said distortion of the earth's magnetic field. In this way, it is possible to combine the advantages gained from the detection of these magnetic distortions (such as for example their insensitivity to climatological conditions, glaring sunlight, etc.), with the advantages gained from other detection means (such as for example the greater action radius).

BRIEF DESCRIPTION OF THE DRAWINGS

Other advantages and characteristics of the invention can be appreciated from the following, non-limiting description, of a preferred embodiment of the invention, with reference to the accompanying drawings, in which.

DETAILED DESCRIPTION OF THE INVENTION—EXAMPLES OF EMBODIMENTS

There follows a description of the embodiment of the invention. To this end, the description starts with a vehicle provided with two 2-way sensors each housed in a rear view mirror on the vehicle. In the interest of simplicity, it has been assumed that the co-ordinate origin is the geometrical centre of the vehicle and that the X axis is the vehicle's longitudinal axis. The Y axis is horizontal and the Z axis is vertical. Each sensor (r1 and r2) detects the two components Bx and By in the magnetic field. The vehicle is orientated so that its X axis is parallel to the NS axis in the earth's magnetic field, and the vehicle is facing magnetic north.

Figure 1:
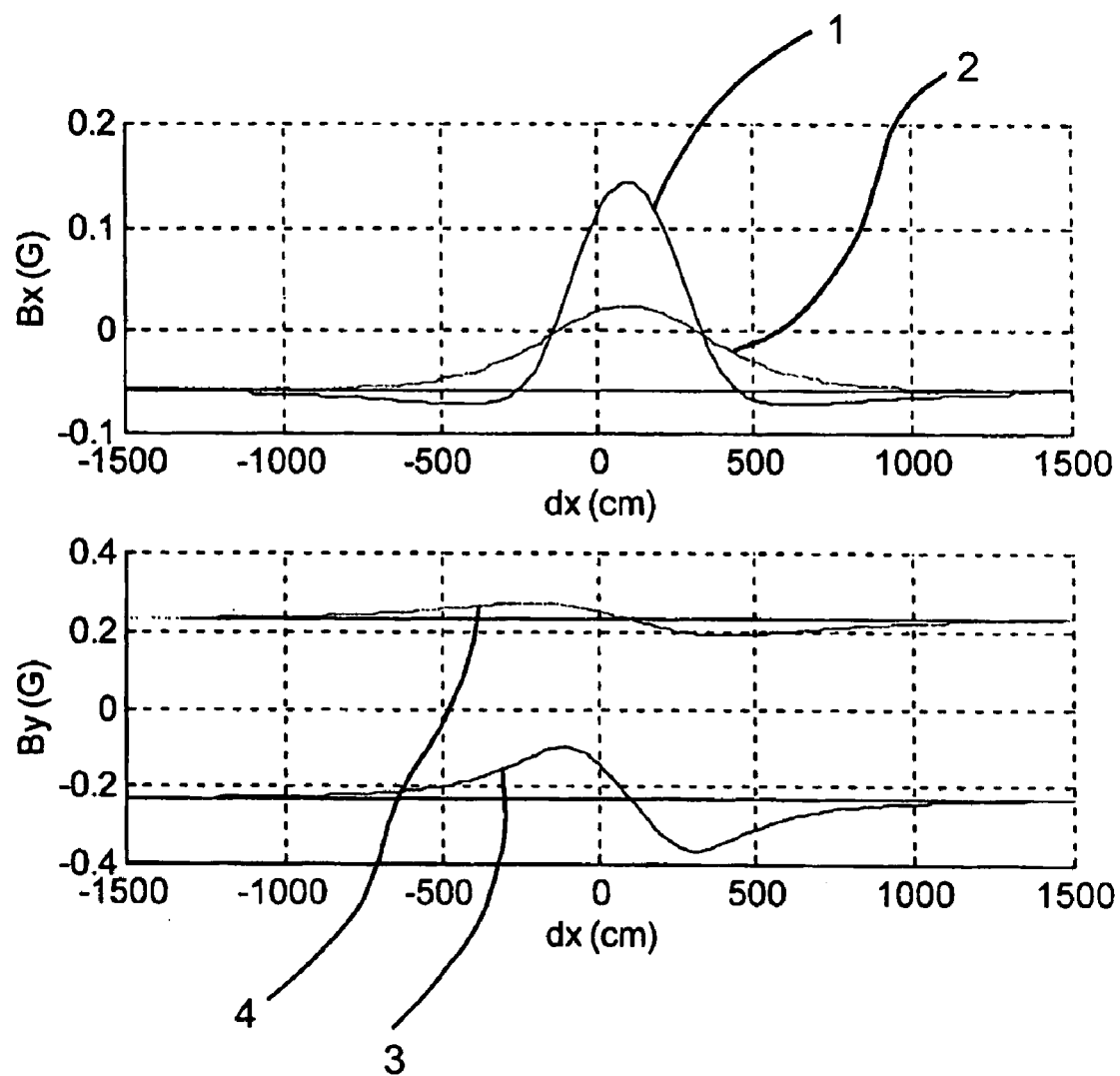
FIG. 1 is a graph showing the magnetic field detected during an over-taking manoeuvre.

FIG. 1 shows the magnetic field (Bx and By, in Gauss) that is detected when the vehicle is overtaken by an object (another vehicle) in function of the distance (in cm) between the centres of the two vehicles. The curves 1 and 3 correspond to the sensor in the rear view mirror on the driver's side (r1), while the curves 2 and 4 correspond to the sensor in the rear view mirror on the passenger's side (r2). These curves are a function of the vehicle's orientation in relation to the earth's magnetic field.

Figure 2:
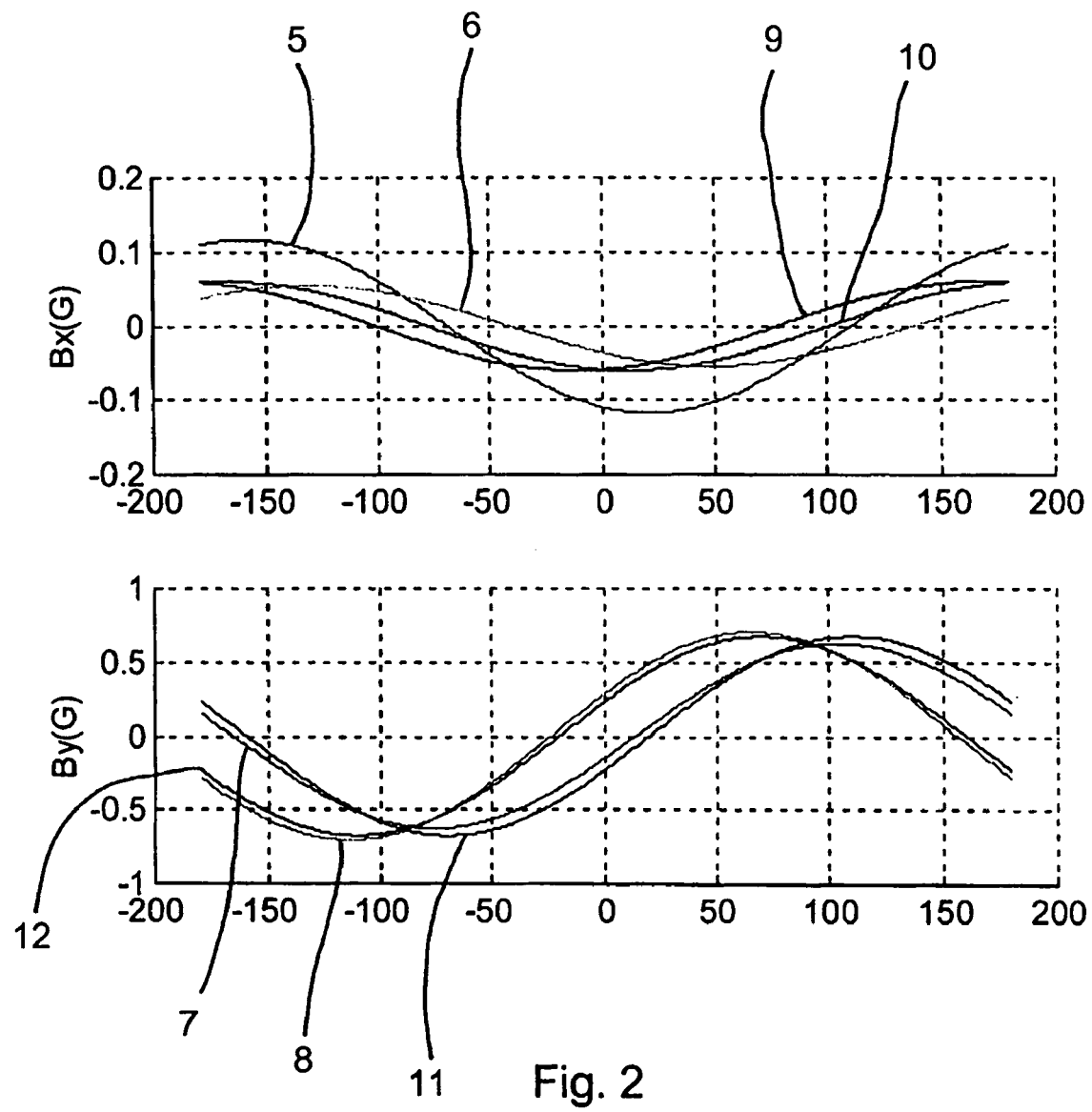
FIG. 2 is a graph showing the magnetic field detected during a turn.

FIG. 2 shows the magnetic field (Bx and By, in Gauss) that is detected when both vehicles turn (for example if both vehicles travel along a curve maintaining the relative position between them constant) in function of the angle turned (in sexagesimal degrees). The curves 5 and 7 correspond to sensor r1 whereas the curves 6 and 8 correspond to sensor r2. The curves 9, 10, 11 and 12 are the curves corresponding to a turn made by the vehicle carrying the detection device when no object is present (when no second vehicle is present).

One way of performing calibration is by means of the following method:

1. Turn the vehicle 360° and determine the values (Bxmax, Bxmin, Bymax, Bymin) for each of the sensors r1 and r2

2. Calculate the correction and offset factors:

$Xcorr = (Bymax - Bymin)/(Bxmax - Bxmin)$ $Ycorr = (Bymax - Bymin)/(Bxmax - Bxmin)$ $Xoff = [(Bxmax - Bxmin)/2 - Bxmax] Xcorr$ $Yoff = [(Bymax - Bymin)/2 - Bymax] Ycorr$ 3. Re-calculate the values of the magnetic field measured as:

$$Bx'=Bx\text{corr}+Bx+Bx\text{off} \quad By'=By\text{corr} \; By+By\text{off}$$

Figure 3:
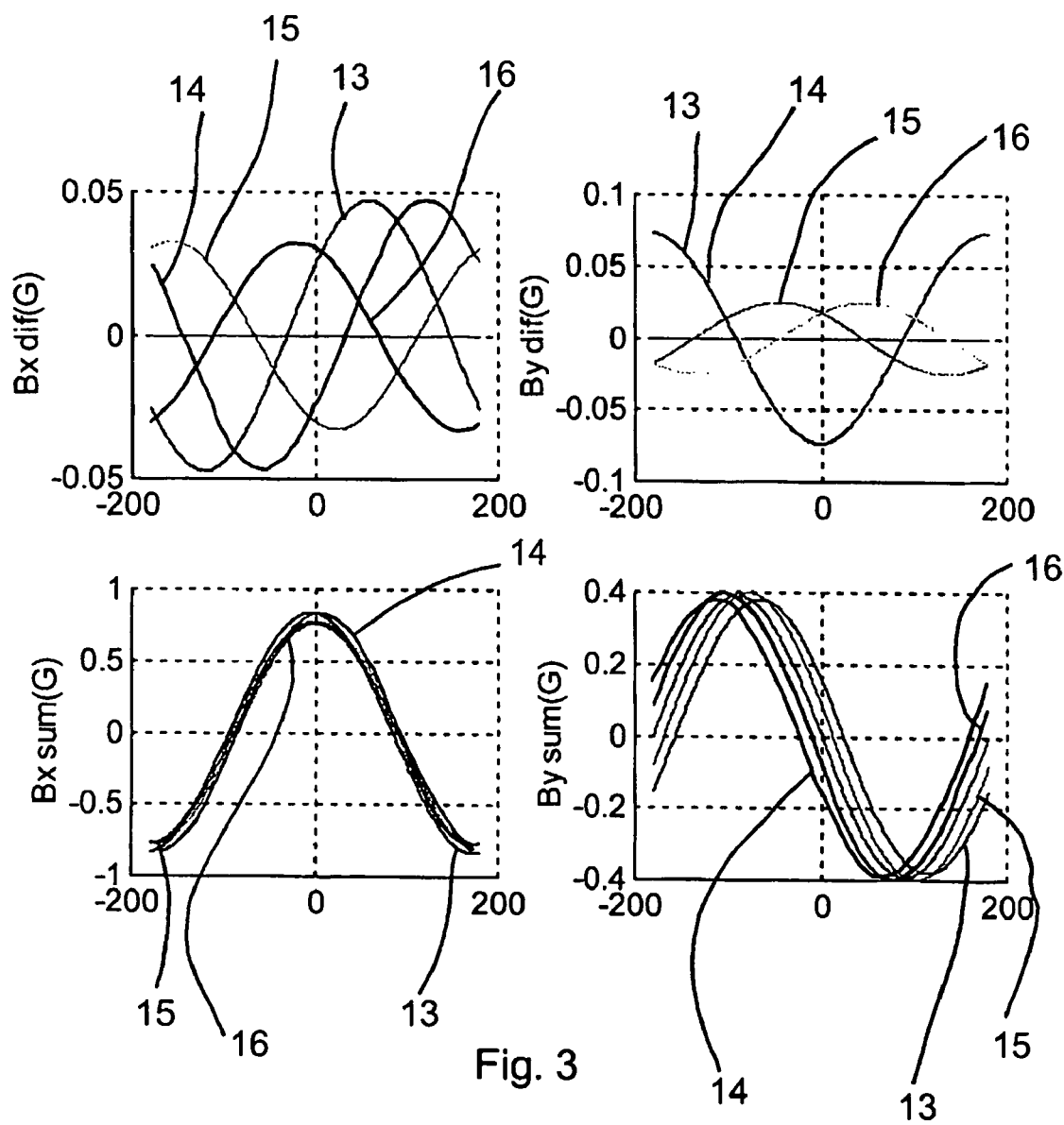
FIG. 3 is a graph showing some functions of the magnetic field during a turn.

After obtaining the calibrated data, an object can be detected in any of the four possible quadrants, with respect to the co-ordinate centre (centre of the vehicle). FIG. 3 shows the curves 13, 14, 15 and 16 representing the case where an object is present in each of the quadrants. The vertical axis shows the following calibrated values:

$$Bx\text{dif}=Bx(r1)-Bx(r2)$$

$$By\text{dif}=By(r1)-By(r2)$$

and the horizontal axis shows the angle turned (in sexagesimal degrees).

The calibrated values that are obtained when no object is present form a straight line c having the constant value e that is equivalent to 0.

Moreover, it is advisable to also obtain the data of the sum of the signals from sensors r1 and r2 Bxsum and Bysum, as calibrated values, which are shown in FIG. 3 as well.

The Bydif data can be used to determine the quadrant containing the object. By means of this data, and by knowing the orientation of the vehicle carrying the detection device in respect to the earth's magnetic field, it is possible to determine the quadrant containing the object and, therefore, whether said object is in the blind spot. Therefore, for example, curves 13 and 14 correspond to an object located in the front of the sensor.

By means of this data and graphs equivalent to those in FIG. 1 (when the vehicle carrying the detection device is being overtaken by another vehicle) and with the Bxsum, Bysum, Bxdif and Bydif values mentioned above, it is possible to determine both the position of the object and its relative speed in relation to the sensor.

Generally, the signal detected by the sensor is amplified and digitalised by means of the corresponding electronic circuit. The signal is very sensitive to all kinds of electromagnetic noise, particularly the noise produced by the vehicle itself, for example by the indicators. Therefore, it is advisable to analyse and conveniently prepare the area around the desired location of the sensor, and to try and shield the sensor from possible sources of noise. It is also advisable to add any filters that may be required so as to obtain a signal that is as noise-free as possible.

It is possible to perform the correction of the sensor data, in order to compensate the distortion caused by the vehicle carrying the detection device (the afore-mentioned calibration), on either the analogue or digital signal.

In order to ascertain the vehicle's orientation with respect to the earth's magnetic field, information is collected on the three spatial components in the detected magnetic field, and they are filtered and averaged over time. The information on the possible presence of an object is therefore determined once the vehicle is orientated and the signals are received, as mentioned earlier. Moreover, it is possible that the detection device only works with magnetic field values having just two spatial components.

In some simple cases, the signal may be treated analytically since the received signals are sufficiently simple and void of superimposed effects. However, in the case of more complex traffic situations, the received signals include a plurality of superimposed effects (other vehicles travelling in different directions or which are stopped, stationary elements on the roadside, etc). In these cases, it is advisable to use a neural processor. This neural processor is able to recognise situations in which the vehicle carrying the detection device is being overtaken by an object (another vehicle) once it has completed a training stage. This means the analytical resolution of complex mathematical equations is unnecessary. The processor consists of a specialised neuronal machine, designed in VLSI technology and capable of implementing a layer of a special type of artificial neural net: the multilayer perceptron. The recognition processor comprises a central sequential process unit, connected to a parallel processor that is made up of a series of process units or artificial neurons which operate simultaneously on the same data and which are optimised for calculating the output from a neural net of a multilayer perceptron. The central processor and the parallel processor are housed in a highly complex integrated circuit based on semiconductors (chip). The neural net can be trained using various methods, such as for example the reactive tabu search, or backpropagation, which are known to the person skilled in the art. The training is carried out by means of a selected database which includes relevant important and paradigmatic cases.

Logically, different kinds of neural nets can be used other than the multilayer perceptron which can be implemented as an executable program in a central sequential process unit.

The invention claimed is:

1. A device for detecting the presence of objects in a blind spot of a vehicle, said objects containing at least a ferromagnetic material or being manufactured by at least one ferromagnetic material whereby they distort the earth's magnetic field, said device being of the type that is mounted on the vehicle, said vehicle having at least one blind spot, where said detection device can detect said object located in said blind spot, characterised in that it is provided with means for detecting said distortion of said earth's magnetic field caused by said object.

2. The detection device according to claim 1, characterised in that it comprises: [1] at least one magnetic field sensor, capable of producing electric signals in function of said magnetic field, [b] an electronic circuit which converts said electric signals into digitalised signals, [c] a logical circuit that analyses said digitalised signals in order to analyse the presence of said object in said blind spot, and which produces output signals that vary in function of the result of said analysis, and [d] indicator elements activated by said output signals.

3. The detection device according to claim 2, characterised in that said sensors are of the group made up of flux gate magnetometers (flux-gate sensor), Hall type sensors, magnetoinductive sensors and magnetoresistive sensors.

4. The detection device according to claim 2, characterised in that said sensors can detect at least two of the three spatial components in a magnetic field.

5. The detection device according to claim 1, characterised in that it comprises a device for measuring the inclination angle of said vehicle with respect to a horizontal plane.

6. The detection device according to claim 2, characterised in that said sensors have a resolution level less than or equivalent to 0.01 Gauss.

7. The detection device according claim 2, characterised in that said sensors are current fed.

8. The detection device according to claim 1, characterised in that it reads said magnetic field at least once every 100 ms.

9. The detection device according to claim 1, characterised in that it can distinguish whether said object is another vehicle approaching or another object.

10. The detection device according to claim 2, characterised in that said logical circuit comprises neural nets.

11. The detection device according to claim 2, characterised in that it has an action radius of at least 4 meters, measured from each of said sensors.

12. The detection device according to claim 1, characterised in that it is provided with a sensor housed within the outside rear view mirror assembly on said vehicle.

13. The detection device according to claim 12, characterised in that it is provided with a sensor in each of the outside rear view mirrors on said vehicle.

14. The detection device according to claim 1, characterised in that it is provided with at least one sensor in the rear of said vehicle.

15. The detection device according to claim 1, characterised in that it is provided with two sensors positioned in symmetrical arrangement with respect to the longitudinal axis of the vehicle, and in that it calculates the difference between the signals produced by each of said sensors.

16. The detection device according to claim 2, characterised in that it is provided with calibrated data whereby it is possible to subtract from the signal produced by each of said sensors the part corresponding to the distortion of the earth's magnetic field caused by the vehicle itself.

17. The detection device according to claim 16, characterised in that it detects, in addition whether said vehicle has begun to indicate that an object is approaching.

18. The detection device according to claim 17, characterised in that said activated indicator elements includes at least one of the activated indicator elements from the group: illuminating the indicator light, turning the steering wheel, and activating the door opening device.

19. The detection device according to claim 18, characterised in that said indicator light include light signals having at least two colours, with each colour indicating a different warning level.

20. The detection device according to claim 19, characterised in that said indicator light include an output element which provides a pictogram representation, where said output element is a LED matrix or a screen.

21. The detection device according to claim 1, where said vehicle is provided with doors equipped with a safety lock, characterised in that said device can act upon said lock.

22. The detection device according to claim 1, characterised in that it includes other means for detecting the presence of objects, in addition to said means for detecting said distortion of said earth's magnetic field.

\* \* \* \* \*